March 23, 1943.  R. L. OHLS  2,314,732

VALVE

Filed Aug. 16, 1941  3 Sheets-Sheet 1

Robert L. Ohls.
INVENTOR.

BY
ATTORNEYS

March 23, 1943. R. L. OHLS 2,314,732
VALVE
Filed Aug. 16, 1941 3 Sheets-Sheet 2

Robert L. Ohls.
INVENTOR.
BY
ATTORNEYS

March 23, 1943. R. L. OHLS 2,314,732
VALVE
Filed Aug. 16, 1941 3 Sheets-Sheet 3
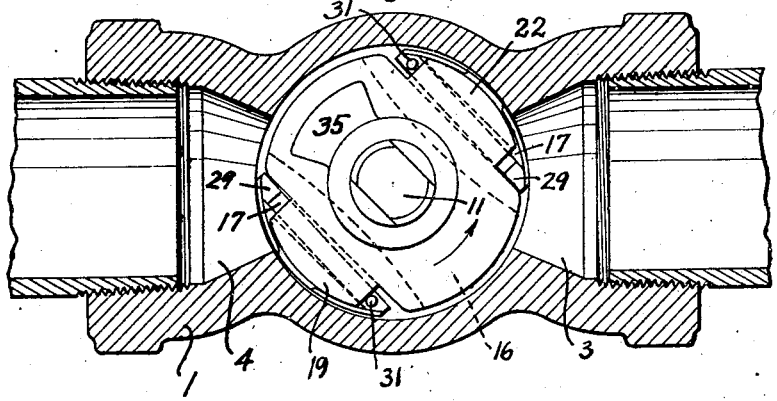
Fig. 5.
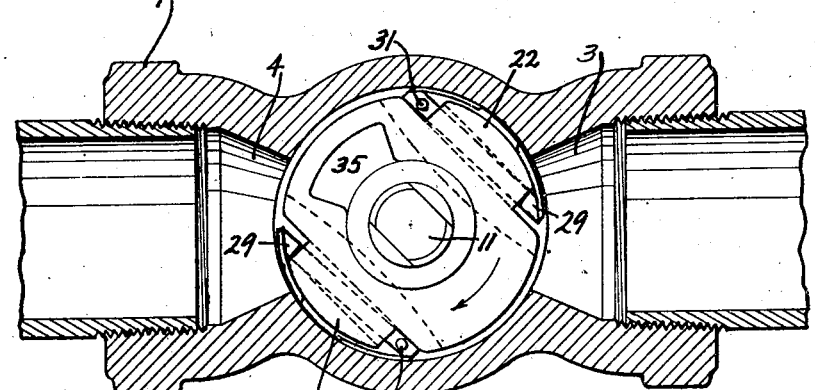
Fig. 6.
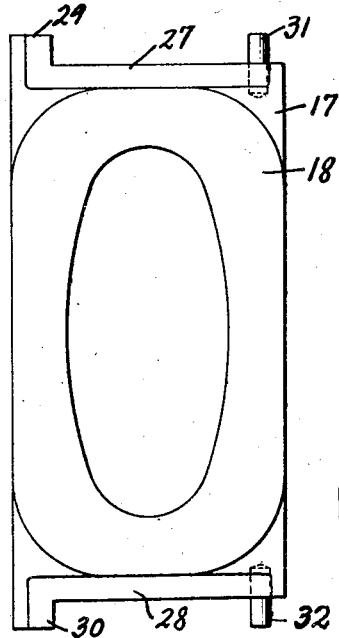
Fig. 7.
Fig. 8.
Robert L. Ohls.
INVENTOR.
BY
ATTORNEYS Patented Mar. 23, 1943

2,314,732

UNITED STATES PATENT OFFICE 2,314,732

VALVE

Robert L. Ohls, Houston, Tex., assignor to Reed Roller Bit Company, Houston, Tex., a corporation of Texas Application August 16, 1941, Serial No. 407,173

6 Claims. (Cl. 251—102)

The invention in the present application relates to valves of the so-called modified-plug type and has for its general object the provision of a valve with retractable closure members in which the leading edge of the closure member is raised from its seat to facilitate displacement of the valve closure over its seat.

A number of valves of the modified-plug type have been devised in which the closure segments are retractable from their seats to facilitate movement of the valve segments over the seats.

A more specific object of the present invention is to provide a mechanism in a valve construction having retractable valve closure segments whereby, regardless of the direction of movement, i. e., toward open or toward closed position, the edge of the valve segment, which in that particular instance is the leading edge, will be retracted.

Another object of this invention is to provide a valve having a retractable closure member adapted to cooperate with a closure carrier and means on the closure carrier for engaging portions of the closure adjacent the leading edge thereof regardless of the direction of movement to retract said leading edge from its seat.

A further object of this invention is to provide a valve having a retractable closure member supported on a carrier and means on the carrier for cooperating with different portions of the closure member depending upon the direction of movement of the carrier to raise the edge of the closure which is the leading edge thereof regardless of the direction of movement.

Other objects of the present invention will be apparent from the description hereinafter set forth and from the accompanying drawings.

In the drawings:

Fig. 5 is a view somewhat similar to Fig. 2 with the valve in a partly closed and partly open position during opening movement of the valve;

Fig. 6 is a view similar to Fig. 5 showing the parts in the position which they assume during closing movement of the valve;

Fig. 7 is an elevational view of one of the valve closure segments embodied in the present invention, and Fig. 8 is a top-plan view of the closure segment shown in Fig. 7.

Figure 2:
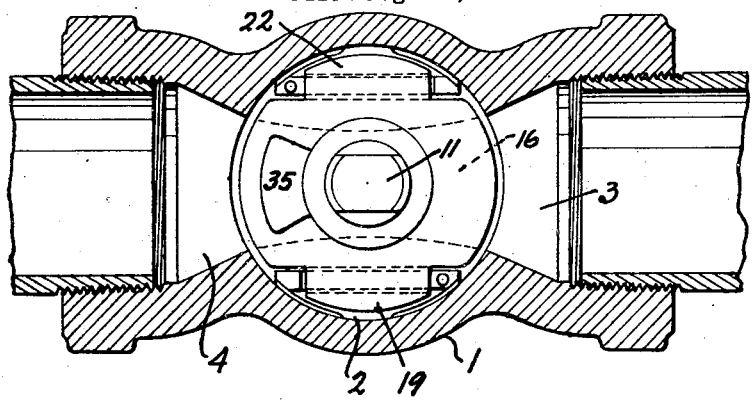
Fig. 2 is another sectional view of the valve shown in Fig. 1 taken on a plane perpendicular to the axis of the valve stem.
Figure 1:
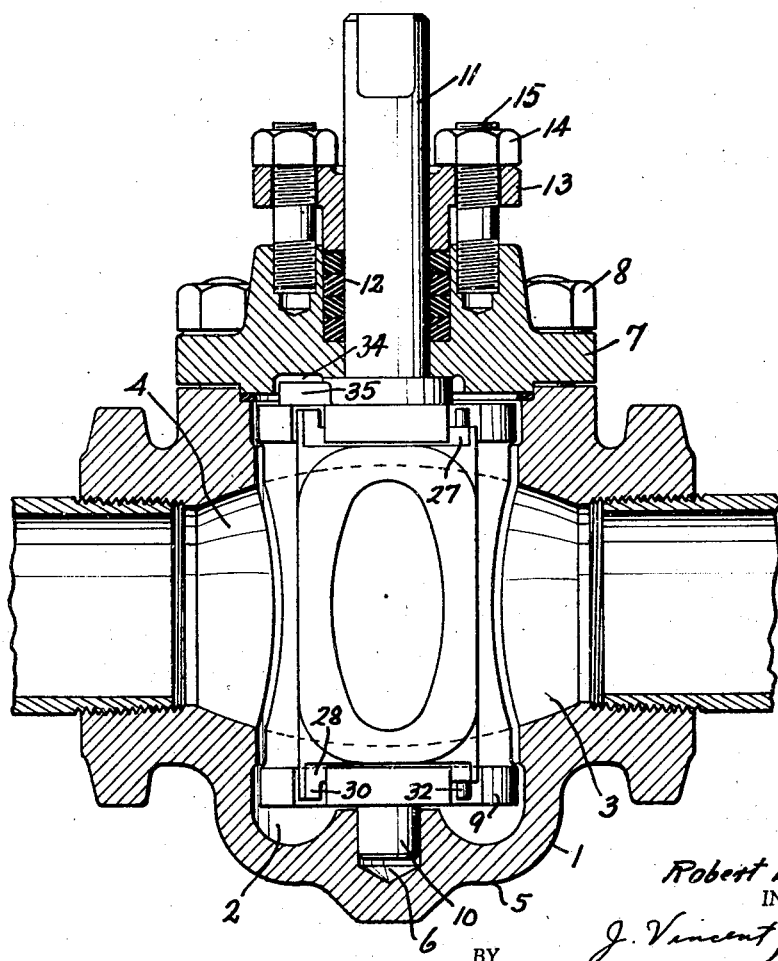
Fig. 1 is an axial sectional view of a valve embodying the features of the present invention.

Referring to the drawings in which similar parts are represented by like reference characters, it will be noted that the valve embodying the present invention comprises a valve body or casing 1 provided with a cylindrical bore 2 forming a valve chamber. Access to the valve chamber is afforded by means of ports 3 and 4 either of which may serve for the inflow or outflow of fluid into and out of the chamber 2. The direction of flow of the fluid is immaterial to the operation of the valve structure.

As indicated in the drawings the lower end of the cylindrical bore is closed by an integral closure 5 but which obviously may be formed as a separate element connected to the valve body. A center recess is provided in the interior surface of the closure 5 to serve as a bearing for the valve carrier to be hereinafter described.

The upper end of the valve body 1 is closed by a cover or bonnet 7 which is detachably secured to the valve body 1 by means of nuts 8 engaging studs extending upwardly from the valve body 1. Other suitable means for connecting the bonnet to the valve body 1 may, of course, be employed. The bonnet 7 has an opening in the central portion thereof which serves as a bearing for the stem of the valve closure carrier.

The carrier 9 for the closure member is provided with a downwardly extending pin shaft 10 and an upwardly extending stem 11. The pin shaft 10 is positioned within the recess 6 in the bottom closure 5 and the stem 11 extends upwardly through the opening in the bonnet 7. The pin shaft 10 and stem 11 are co-axial and by mounting these elements in the recess 6 and in the bonnet 7, as described and shown, the carrier is free to rotate about the common axis of the pin shaft and stem.

In the upper portion of the bonnet 7 the opening through which the stem 11 extends is of somewhat larger diameter to provide a space for packing material 12. A plunger 13 surrounds the stem 11 and has a portion adapted to enter the enlarged opening in the bonnet 7 to compress the packing material tightly about the stem 11 and thereby provide a leakproof joint. Adjustment of the position of the plunger 13 is effected by rotation of the nuts 14 on the threaded studs 15.

The closure carrier comprises a body having a passage or flow opening 16 extending transversely therethrough and adapted to be brought into register with the ports 3 and 4 to permit free and unrestricted flow from one port through the flow opening to the other port. On each side of the flow opening or passage 16 the carrier 9 is flattened to provide a space between the body of the carrier 9 and the wall of the cylindrical bore for the segmental closure members 17. The segmental closure members have seating surface 18 on their outer portions adapted to engage the wall of the cylindrical bore about the ports 3 and 4. In this connection, it will be noted that the wall of the cylindrical bore provides a seating surface for the closure members 17. The surface 18 may be metal or of resilient material to insure a tight seal between the closure members 17 and the wall of the bore 2 even when fluid containing grit or sediment is flowing through the valve. Obviously, if desired, replaceable seats (not shown) of sealing material may be employed.

Figure 3:
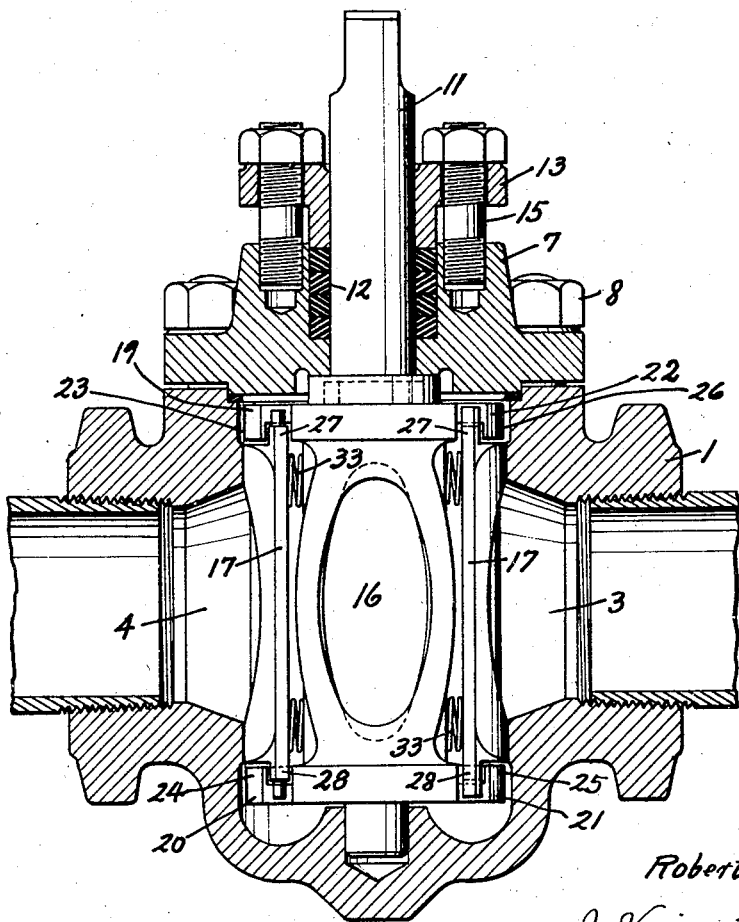
Fig. 3 is a view similar to Fig. 1 showing a valve in closed position.

As is more clearly seen in Fig. 3, the carrier 9 has outwardly extending portions 19, 20, 21 and 22 at each end thereof on the flattened sides thereof. Said extending portions 19, 20, 21 and 22 are provided with lugs 23, 24, 25 and 26 respectively on the outer ends thereof. The lugs on one end of the carrier 9 extend in an axial direction toward the lugs on the other end of the carrier and cooperate therewith to provide a cage for loosely holding the segmental closure members 17 in position on the carrier. In this connection the upper and lower ends of the closure members are provided with narrow rectangular portions 27 and 28 which enter between the lugs 23, 24, 25 and 26 and the flattened portions of carrier 9. It should be noted that the thickness of the portions 27 and 28 is less than the distance between the lugs 23, 24, 25 and 26 and the flat portions of carrier 9 so that the carrier can move to a certain extent without moving the closure segment.

On each end of the closure members 17 adjacent one side there are provided lugs 29 and 30 for limiting sliding movement of the closure members in the carrier 9. On the ends adjacent the other side are removable pins 31 and 32 which when removed permit sliding of the segments into assembled position between the pairs of lugs on each side of the carrier. After assembly of the closure members 17 in position, insertion of the pins 31 and 32 prevents removal of the closure members from the carrier and limits movement of the carrier relatively to the closure members.

It will be observed from Figs. 2, 4, 5 and 6 of the drawings that the distance between the lugs 29 and 30 and pins 31 and 32 is greater than the width of the outwardly extending portions of the carrier 9. This permits the carrier to have a certain degree of lost motion relative to the segmental closure members.

Springs 33 are interposed between the closure members 17 and the flattened portions of carrier 9 to urge the closure members into contact with the wall of the cylindrical valve chamber in the body 1.

The bonnet 7 has a sector-like recess in the under surface thereof in which moves a sector-like lug 35 carried by the carrier 9. This lug and recess cooperate to limit rotary movement of the carrier in the valve body 1.

Figure 4:
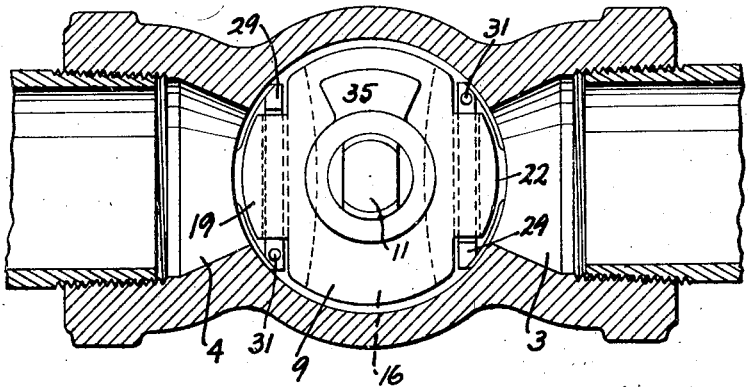
Fig. 4 is a view similar to that of Fig. 2 showing the valve in closed position.

When the valve is in open position as shown in Fig. 2 and it is desired to move it in a clockwise direction to the closed position shown in Fig. 4, the carrier is rotated through a certain distance before rotary motion is imparted to the closure members 17. During this initial movement of the carrier 9, the lugs 23, 24, 25 and 26 are brought into engagement with the rectangular portions 27 and 28 of the members 17 at the leading side edges of said lugs as indicated in dotted lines in Fig. 6 of the drawings. After the leading side edges of the lugs 23, 24, 25 and 26 engage the portions 27 and 28 of the closure members further rotary movement of the carrier will drive said leading side edges of the lugs in a wedge-like manner between the portions 27 and 28 and the wall of the cylindrical valve chamber. This wedging or camming action will retract the leading edges of the closure members from engagement with the wall of the cylindrical valve chamber. The lugs do not engage the cylindrical wall.

The retraction action is continued until the outwardly extending portions 19, 20, 21 and 22 of the carrier engage the fixed lugs 29 and 30, then the closure members 17 will be carried along by the carrier. Fig. 6 illustrates the position of the elements during the movement of the closure members from open to closed positions. During this movement the leading edges of the closure members will be retracted or lifted in the manner of a sled so that they easily slide over cylindrical wall of the valve chamber.

After the valve has been closed (see Fig. 4) and it is desired to open it, the carrier 9 is moved in a counter-clockwise direction as indicated in Fig. 5. At the beginning of this movement the now leading edges of the lugs 23, 24, 25 and 26 engage the adjacent portions of the parts 27 and 28 of the closure members and retract the leading edges of said closure members from the wall of the valve chamber. After retraction and engagement of the lugs 23, 24, 25 and 26 with pins 31 and 32 the closure members will be carried along with the carrier with parts in the positions shown in Fig. 5.

From the foregoing description, it will be realized that regardless of the direction of rotation of the carrier 9 the then leading edges of the closure members will be lifted or retracted prior to and during movement to avoid undue friction between the closure members and the wall of the valve chamber by the closure members and to permit easy sliding movement of the closure members over said wall.

Having described my invention, I claim:

1. In a valve of the character described, a port, a retractable closure slidably movable over said port, a movable carrier for said closure, means for transmuting movement of the carrier in one direction into retracting movement of the leading edge of the closure when moved in said direction and for transmuting movement of the carrier in the other direction into retracting movement of the other edge of said closure, and means adjacent each edge of the closure operable after retracting movement for moving the closure with the carrier.

2. A valve comprising a valve body having a cylindrical chamber therein and ports communicating with said chamber, a carrier rotatably mounted in said chamber co-axially thereof, segmental closure members positioned in said chamber for circumferential movement to and from positions to close said ports and for radial movement away from the wall of said chamber, means including a lost motion connection for transmuting rotary movement of the carrier to circumferential movement of the closures, and means operable during rotary movement of the carrier relatively to the closure members in both directions of rotation for retracting that of the two edges of each closure which in the direction of rotation of the carrier is the leading edge.

3. In a valve of the character described, a port, a retractable closure slidably movable over said port, a movable carrier for said closure, means for transmuting movement of the carrier in one direction into retracting movement of the leading edge of the closure when moved in said direction and for transmuting movement of the carrier in the other direction into retracting movement of the other edge of said closure, and a lost motion connection between the carrier and closure for moving the closure with the carrier after retraction of the closure.

4. A valve comprising a valve body having a cylindrical chamber therein and ports communicating with said chamber, a carrier rotatably mounted in said chamber co-axially thereof, a segmental closure member positioned in said chamber for circumferential movement to and from positions to close said port and for radial movement away from the wall of the chamber, cooperating means on the closure and carrier operable in one direction of rotation of the carrier to retract that edge of the closure which is the leading edge in said direction of rotation of the carrier and operable in the other direction of rotation of the carrier for retracting the other edge of the closure, prior to the transmission of circumferential movement from the carrier to the closure, and a lost motion connection between the carrier and closure for moving the closure with the carrier after retraction of the closure.

5. A valve comprising a valve body having a cylindrical chamber therein and ports communicating with said chamber, a carrier rotatably mounted in said chamber co-axially thereof, a segmental closure member positioned in said chamber for circumferential movement to and from positions to close said port and for radial movement away from the wall of the chamber, outwardly extending arms on said carrier at each end thereof, lugs on the outer portions of said arms extending toward each other to provide a cage, said closure having end portions at its ends positioned between the lugs and the carrier and adapted to be engaged by the side of the lugs which is the leading side upon rotation of the carrier in one direction to retract the corresponding leading edge of the carrier, and lugs adjacent the side edges of the end portions of the closure for engaging the arms of the carrier to move the closure along with the carrier.

6. A valve comprising a valve body having a cylindrical chamber therein and ports communicating with said chamber, a carrier rotatably mounted in said chamber co-axially thereof, a segmental closure member positioned in said chamber for circumferential movement to and from positions to close said port and for radial movement away from the wall of the chamber, outwardly extending arms on said carrier at each end thereof, lugs on the outer portions of said arms extending toward each other to provide a cage, said closure having end portions at its ends positioned between the lugs and the carrier and adapted to be engaged by the side of the lugs which is the leading side upon rotation of the carrier in one direction to retract the corresponding leading edge of the closure, and lugs adjacent the side edges of the end portions of the closure for engaging the arms of the carrier to move the closure along with the carrier, the last recited lugs adjacent one side of the closure being removable to facilitate assembly of the closure within the cage formed by the arms and lugs on the ends of the arms.

ROBERT L. OHLS.